United States Patent
Yamaguchi (10) Patent No.: US 7,921,397 B2
(45) Date of Patent: Apr. 5, 2011

(54) METHOD OF DESIGNING SEMICONDUCTOR INTEGRATED CIRCUITS, AND SEMICONDUCTOR INTEGRATED CIRCUITS THAT ALLOW PRECISE ADJUSTMENT OF DELAY TIME

(75) Inventor: Yusuke Yamaguchi, Chiba (JP)

(73) Assignee: Kawasaki Microelectronics, Inc., Chiba (JP)

( * ) Notice: Subject to any disclaimer, the term of this patent is extended or adjusted under 35 U.S.C. 154(b) by 570 days.

(21) Appl. No.: 12/000,409

(22) Filed: Dec. 12, 2007

(65) Prior Publication Data

US 2008/0148206 A1   Jun. 19, 2008

(30) Foreign Application Priority Data

Dec. 15, 2006  (JP) .................... 2006-337839

(51) Int. Cl.
  *G06F 17/50*  (2006.01)
(52) U.S. Cl. ........................ 716/119; 716/130
(58) Field of Classification Search .................... 716/18, 716/119, 130
  See application file for complete search history.

(56) References Cited

U.S. PATENT DOCUMENTS

| | | | |
|---|---|---|---|
| 5,440,260 A | 8/1995 | Hayashi et al. | |
| 5,506,534 A | 4/1996 | Guo et al. | |
| 6,025,740 A | 2/2000 | Fukuyama | |
| 6,269,280 B1 | 7/2001 | Miyanishi et al. | |
| 6,591,407 B1* | 7/2003 | Kaufman et al. | 716/10 |
| 6,859,082 B2 | 2/2005 | Tang | |
| 6,904,572 B2* | 6/2005 | Igarashi | 716/2 |
| 6,928,631 B2 | 8/2005 | Matsumoto | |
| 7,042,266 B2 | 5/2006 | Takahashi | |
| 7,222,311 B2* | 5/2007 | Kaufman et al. | 716/2 |
| 2001/0035799 A1* | 11/2001 | Ueno et al. | 333/33 |

FOREIGN PATENT DOCUMENTS

| | | |
|---|---|---|
| JP | A-06-247241 | 9/1994 |
| JP | A-09-191239 | 7/1997 |
| JP | A-2003-152078 | 5/2003 |
| JP | A-2003-163584 | 6/2003 |
| JP | A-2005-100450 | 4/2005 |
| JP | A-2006-269900 | 10/2006 |

* cited by examiner

*Primary Examiner* — Jack Chiang
*Assistant Examiner* — Brandon W Bowers
(74) *Attorney, Agent, or Firm* — Oliff & Berridge, PLC (57) ABSTRACT

Standard cell libraries and methods of designing semiconductor integrated circuits are provided. At least one of delay-adjusting cell data and load-capacitor cell data is stored in the cell library for a specified type standard cell in addition to the standard cell data. The specified type standard cell may be utilized as a delay-adjusting cell or a load-capacitor cell. Accordingly, precise adjustment of delay times during designing a semiconductor integrated circuit is enabled without requiring registering a new standard cell in the cell library. Semiconductor integrated circuits are also provided that are configured to allow precise adjustment of delay times in the semiconductor integrated circuits.

19 Claims, 7 Drawing Sheets

FIG. 1

| Cell ID | Standard cell data | | | Delay adjusting cell data | | | Load capacitor cell data | |
|---|---|---|---|---|---|---|---|---|
| | logical function | property | layout | terminals | connection pattern | delay time | connection pattern | load capacitance |
| A | Z=fa(A) | delay=a | layout a | | | | | |
| B | Z=fb(A,B) | delay=b | layout b | | | | | |
| C | Z=fc(A1,A2,B) | delay=c | layout c | IN=B,OUT=Z | 1 | d1 | | |
| | | | | | 2 | d2 | | |
| D | Z=fd(A1,A2,B1,B) | delay=d | layout d | | | | 1 | C1 |
| | | | | | | | 2 | C2 |
| | | | | | | | 3 | C3 |
| | | | | | | | 4 | C4 |
| ... | | | | | ... | | | ... |

METHOD OF DESIGNING SEMICONDUCTOR INTEGRATED CIRCUITS, AND SEMICONDUCTOR INTEGRATED CIRCUITS THAT ALLOW PRECISE ADJUSTMENT OF DELAY TIME

This application claims benefit of Japanese Patent Application No. JP-A-2006-337839. The disclosure of the prior application is hereby incorporated by reference herein in its entirety.

BACKGROUND

This invention relates to semiconductor integrated circuits, methods of designing semiconductor integrated circuits, and cell libraries used to design semiconductor integrated circuits. More specifically, this invention relates to semiconductor integrated circuits and methods of designing semiconductor integrated circuits and cell libraries that enable precise adjustment of delay times.

In semiconductor integrated circuits, various logic circuits that conduct various logical operations on various variables are formed to realize desired functions. These logic circuits have signal routes that diverge and merge complexly, and timings of signals at various portions in the signal route that must be synchronized. Accordingly, delay circuits are provided at necessary portions on the signal route in order to adjust the timings.

Generally, buffers are used as delay circuits for adjusting the timings. That is, a plurality of buffers is connected in series at necessary portions in the signal route, and the number of serially connected buffers is selected in order to provide a desired delay time. In such an instance, the delay time can only be adjusted with a step of the delay time of one buffer.

Circuits that can adjust the delay time with a shorter step compared with the case of the serially connected buffers are proposed. For example, Japanese Laid-open Patent Hei 9-191239 discloses a delay circuit in which the delay time can be adjusted with a control signal input to a control terminal. Similar delay circuits are also disclosed in Japanese Laid-open Patent Hei 7-202653 and Japanese Laid-open Patent 2004-135333.

On the other hand, standard cells are generally utilized in designing semiconductor integrated circuits that perform various logical operations. That is, layouts of transistors and interconnections between the transistors necessary to realize various logical functions are prepared beforehand and registered in a library as standard cells. For example, basic gates such as inverters, buffers, AND gates, OR gates, NAND gates, and NOR gates, and other cells having functions of various combinations of the basic gates are registered in the cell library as standard cells. Standard cells that are required to fulfill the specification of each semiconductor integrated circuit are selected from the cell library, and connected with each other. As a result, signal routes are formed, and logic circuits that constitutes a semiconductor integrated circuit or a circuit block including a plurality of logic circuits are constructed.

In order to utilize the delay circuits described in the above-cited reference in the design of semiconductor integrated circuits using the standard cell technique, standard cells of the delay circuits should be prepared and registered in the cell library. However, such procedures are lengthy, cumbersome, and not easily implemented.

SUMMARY

Various exemplary embodiments aim to solve the problems described above. The exemplary embodiments provide standard cell libraries and methods of designing semiconductor integrated circuits that can allow precise adjustment of delay times during the design phase of the semiconductor integrated circuit without requiring preparing and registering standard cells of delay circuits in a cell library. The exemplary embodiments also provide semiconductor integrated circuits that can allow precise adjustment of delay times in the semiconductor integrated circuit without requiring preparing and registering standard cells of delay circuits in the cell library.

In order to address the above, various exemplary embodiments provide a standard cell library that includes standard cell data including logical function data and layout data for each of a plurality of types of standard cells and delay-adjusting cell data for a specified type standard cell among the plurality of types of standard cells. The specified type standard cell has a plurality of input terminals and an output terminal, and delay-adjusting cell data allows assessing correspondence between i) delay times between a delay input terminal selected from the plurality of input terminals and the output terminal, and ii) a plurality of delay-adjusting cell connection patterns for connecting other ones of the plurality of input terminals to respective ones of a plurality of fixed potentials.

According to various other embodiments, the delay-adjusting cell data may further allow assessing the correspondence between delay times and the plurality of delay-adjusting cell connection patterns for each of a plurality of different load capacitances connected to the output terminal.

In order to address the above, various exemplary embodiments provide a method of designing semiconductor integrated circuits that includes preparing a standard cell library. The standard cell library includes standard cell data including logical function data and layout data for each of a plurality of types of standard cells and a delay-adjusting cell data for a specified type standard cell among the plurality of types of standard cells. The specified types of standard cell has a plurality of input terminals and an output terminal and the delay-adjusting cell data allows assessing correspondence between i) delay times between a delay input terminal selected from the plurality of input terminals and the output terminal and ii) a plurality of delay-adjusting cell connection patterns for connecting other ones of the plurality of input terminals to respective ones of a plurality of fixed potentials. The method further includes selecting a second plurality of types of standard cells including the specified type standard cell from the plurality of types of standard cells, and placing a plurality of standard cells based on the layout data for each of the second plurality of types of standard cells and routing the placed standard cells with each other to design a semiconductor integrated circuit. The semiconductor integrated circuit includes a circuit block, and the circuit block includes at least one logic circuit having a signal route. Further, the placing and routing includes connecting a delay input terminal selected from a plurality of input terminals and an output terminal of a first standard cell, which is placed based on the layout data for the specified type standard cell, to a first node and a second node, respectively, on the signal route, and connecting other ones of the plurality of input terminals with a first connection pattern selected from the plurality of delay-adjusting cell connection patterns to respective ones of the plurality of fixed potentials.

According to various other embodiments, the method further includes, after the placing and routing, performing a timing evaluation of the logic circuit and correcting the first connection pattern depending on a result of the evaluation.

In order to address the above, various exemplary embodiments provide a method of designing semiconductor integrated circuits that includes: selecting, from a standard cell library comprising standard cell data including logical function data and layout data for each of a plurality of types of standard cells, a second plurality of types of standard cells including a specified type standard cell; and placing a plurality of standard cells based on the layout data for each of the second plurality of types of standard cells and routing the placed standard cells with each other to design a semiconductor integrated circuit. The semiconductor integrated circuit includes a circuit block, and the circuit block includes at least one logic circuit having a signal route. The placing and routing includes connecting a delay input terminal selected from a plurality of input terminals and an output terminal of a first standard cell, which is placed based on the layout data for the specified type standard cell, to a first and a second node, respectively, on the signal route, and other ones of the plurality of input terminals of the first standard cell with a first connection pattern selected from a plurality of delay-adjusting cell connection patterns for connecting other ones of the plurality of input terminals to respective ones of a plurality of fixed potentials. The placing and routing further includes connecting two or more input terminals and an output terminal of a second standard cell, which is placed based on the layout data for the specified type standard cell, to respective nodes on the signal route such that a result of logical operation between variables input to the two or more input terminals is output from the output terminal.

In order to address the above, various exemplary embodiments provide a semiconductor integrated circuit that includes a circuit block including at least one logic circuit. The logic circuit includes a plurality of standard cells having respective layouts and logical functions placed and routed with each other to form a signal route. The plurality of standard cells include a first standard cell and a second standard cell both having a same specified layout. A delay input terminal selected from the plurality of input terminals and the output terminal of the first standard cell are connected to a first node and a second node, respectively, on the signal route, and other ones of the plurality of input terminal of the first standard cell are connected with a first connection pattern selected from a plurality of delay-adjusting cell connection patterns for connecting other ones of the plurality of input terminals to respective ones of a plurality of fixed potentials. Two or more input terminals and the output terminal of the second standard cell are connected to respective nodes on the signal route such that a result of logical operation of variables input to the two or more input terminals is output from the output terminal.

According to various other embodiments, the semiconductor integrated circuit may further include a switch that selects the first connection pattern.

In order to address the above, various exemplary embodiments according to this invention provide a standard cell library that includes standard cell data including logical function data and layout data for each of a plurality of types of standard cells and load-capacitor cell data for a specified type standard cell among the plurality of types of standard cells. The specified type standard cell has a plurality of input terminals and an output terminal, and the load-capacitor cell data allows assessing correspondence between load capacitances connected to a node and a plurality of load-capacitor cell connection patterns for connecting one or more of the input terminals to the node.

In order to address the above, various exemplary embodiments provide a method of designing semiconductor integrated circuit that includes preparing a standard cell library. The standard cell library includes standard cell data including a logical function data and a layout data for each of a first plurality of types of standard cells and load-capacitor cell data for a specified type standard cell among the first plurality of types of standard cells. The specified type standard cell has a plurality of input terminals and an output terminal, and load-capacitor cell data allows assessing correspondence between load capacitances connected to a node and a plurality of load-capacitor cell connection patterns for connecting one or more of the plurality of input terminals to the node. The method further includes selecting a second plurality of types of standard cell including the specified type standard cell from the first plurality of types of standard cells, and placing a plurality of standard cells based on the layout data for each of the second plurality of types of standard cells and routing the placed standard cells with each other to design a semiconductor integrated circuit. The semiconductor integrated circuit includes a circuit block, and the circuit block includes at least one logic circuit having a signal route. The placing and routing includes connecting a plurality of input terminals of a first standard cell, which is placed based on the layout data for the specified type standard cell, to a first node on the signal route with a first connection pattern selected from i) the plurality of load-capacitor cell connection patterns and ii) a pattern to which none of the input terminals is connected.

In order to address the above, various exemplary embodiments provide a method of designing semiconductor integrated circuits that includes: selecting, from a standard cell library that includes standard cell data including a logical function data and a layout data for each of a first plurality of types standard cells, a second plurality of types of standard cells including a specified type of standard cell; and placing a plurality of standard cells based on the layout data for each of the second plurality of types of standard cells and routing the placed standard cells with each other to design a semiconductor integrated circuit. The semiconductor integrated circuit includes a circuit block, and the circuit block includes at least one logic circuit having a signal route. The placing and routing includes connecting a plurality of input terminals of a first standard cell, which is placed based on the layout data for the specified type standard cell, to a first node on the signal route with a first connection pattern selected from i) a plurality of load-capacitor cell connection patterns for connecting one or more of the plurality of input terminals and ii) a pattern to which none of the plurality of input terminals is connected. The placing and routing further includes connecting two or more input terminals and an output terminal of a second standard cell, which is placed based on the layout data for the specified type standard cell, to respective nodes on the signal route such that a result of logical operation between two or more variables input to the two or more input terminals is output from the output terminal.

In order to address the above, various exemplary embodiments provide a semiconductor integrated circuit that includes a circuit block including at least one logic circuit. The logic circuit includes a plurality of standard cells having respective layouts and logical functions placed and routed with each other to form a signal route. The plurality of standard cells includes a first standard cell and a second standard cell both having a same specified layout. A plurality of input terminals of the first standard cell are connected to a first node on the signal route with a first connection pattern selected from i) a plurality of load-capacitor cell connection patterns for connecting one or more of the plurality of input terminals and ii) a pattern in which none of the plurality of input terminals is connected. Two or more input terminals and an output terminal of the second standard cell are connected to respective nodes on the signal route such that a result of logical operation between variables input to the two or more input terminals is output from the output terminal.

According to various other exemplary embodiments, the semiconductor integrated circuit may further include a switch that selects the first connection pattern.

BRIEF DESCRIPTION OF THE DRAWINGS

Various exemplary details of cell libraries, methods of designing semiconductor integrated circuits, and semiconductor integrated circuits are described with reference to the following figures, wherein.

DETAILED DESCRIPTION OF EMBODIMENTS

Figure 1:
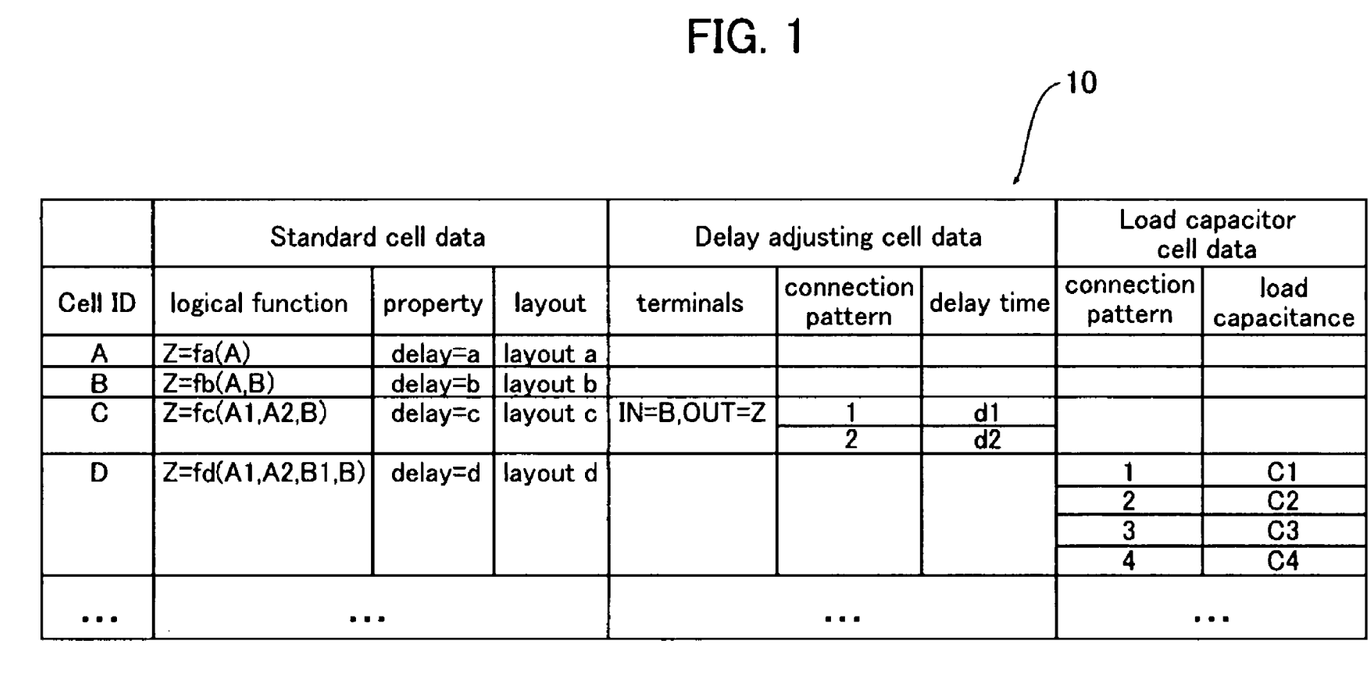
FIG. 1 is a schematic drawing that conceptually shows exemplary data stored in an exemplary cell library.

FIG. 1 is a schematic drawing that conceptually shows exemplary data stored in an exemplary cell library.

In the exemplary cell library 10 shown in FIG. 1, similar to conventional cell libraries, basic gates such as inverters, buffers, AND gates, OR gates, NAND gates, NOR gates, and various other types of cells having functions of various combinations of such basic gates are registered. An ID for indexing each of the types of standard cells and various types of data, which is necessary to utilize each of the types of cells as a standard cell, is stored in the cell library 10. More specifically, for example, data including logical function data, electrical property data (delay time, driving capability, etc.), layout data (dimension of the cell, pattern in each layer, coordinates of input and output terminals, etc.) or the like is stored in the library as standard cell data.

Further, exemplary cell library 10 stores, for some of the plurality of types of registered standard cells (specified types of standard cells, e.g., cell C in FIG. 1), data necessary to utilize each of the specified types of standard cells as a delay-adjusting cell. Specifically, for example, identification of terminals to be used as an input terminal (delay input terminal) and an output terminal when the cell is used as a delay-adjusting cell, delay times between the delay input terminal and the output terminal for respective connection patterns (delay-adjusting cell connection patterns) for connecting the input terminals other than the delay input terminal to respective ones of a plurality of fixed potentials (such as a high level potential and a low level potential), are stored as delay-adjusting cell data. The delay-adjusting cell data allows assessing correspondence between the delay times between the delay input terminal and the output terminal and the delay-adjusting cell connection patterns.

Further, the exemplary cell library 10 stores, for some other types of registered standard cells (second specified types of standard cells, e.g., cell D in FIG. 1), data necessary to utilize each of the second specified types of standard cells as a load-capacitor cells. Specifically, for example, capacitances connected to a node for respective connection patterns (load-capacitor cell connection patterns) for connecting one or more of a plurality of terminals to the node are stored as the load-capacitor cell data. The load-capacitor cell data allows assessing correspondence between load capacitances connected to the node and the load-capacitor cell connection patterns.

The delay input terminal and the output terminal of the delay-adjusting cell are connected to a first node and a second node on a signal route in a logic circuit, respectively. The delay-adjusting cell provides a delay time between the first and the second nodes that can be adjusted by selecting the delay-adjusting cell connection pattern. On the other hand, one or more of the terminals of the load-capacitor cell are connected to a node on the signal route. The load-capacitor cell provides a load capacitance connected to the node that can be adjusted by selecting the load-capacitor cell connection pattern. As a result, a delay time of a cell that drives the node, which might be the delay-adjusting cell or a cell other than the delay-adjusting cell, may be adjusted.

The data stored in the cell library 10 as the delay-adjusting cell data or the load-capacitor cell data is not limited to the data shown in FIG. 1. Different data may be stored as the delay-adjusting cell data as long as the data allows assessing correspondence between the delay times and the connection patterns. Similarly, different data may be stored as the load-capacitor cell data as long as the data allows assessing correspondence between the load capacitances and the connection patterns. As the delay-adjusting cell data, for example, a delay time (a reference delay time) for a specified connection pattern and differences in delay times from the reference delay time for other connection patterns may be stored instead of delay times for respective connection patterns.

As the load-capacitor cell data, for example, capacitances of respective terminals may be stored instead of capacitances for respective connection patterns. By storing capacitances of respective terminals in the library, load capacitances for respective connection patterns for connecting two or more of the terminals may be calculated by summing the capacitances of connected terminals. Accordingly, it is possible to assess correspondence between the load capacitances and the connection patterns.

Figure 2:
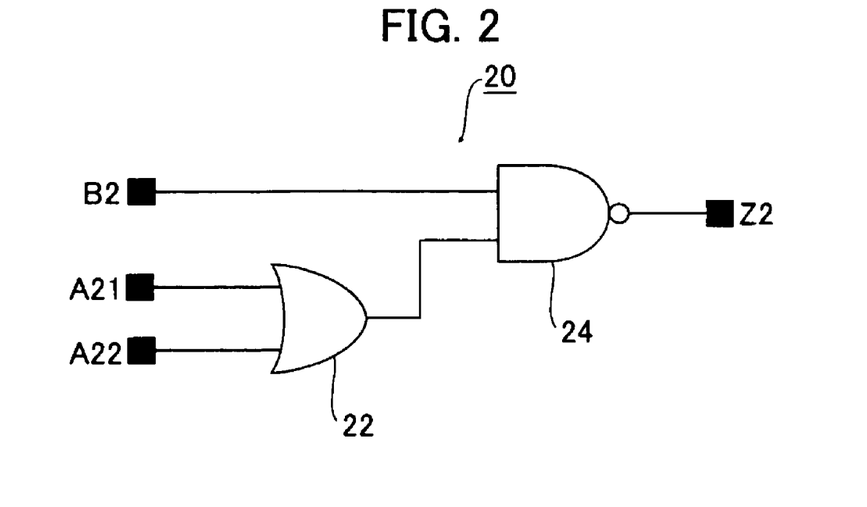
FIG. 2 is a logical circuit diagram showing an exemplary specified type standard cell that can be used as a delay-adjusting cell.

FIG. 2 is a logical circuit diagram showing an exemplary specified type standard cell that can be used as a delay-adjusting cell.

The exemplary standard cell 20 has three input terminals B2, A21, A22 and an output terminal Z2. Logically, the exemplary standard cell 20 is constructed with an OR gate 22 having two input terminals A21 and A22, and a NAND gate 24 having an input terminal B2 and another input terminal to which the output of the OR gate 22 is input. The output terminal of the NAND gate 24 constitutes the output terminal Z2 of the exemplary cell 20. That is, as a standard cell, the exemplary cell 20 has a logical function of performing a logical operation expressed by following equation (1) using signals b2, a21, and a22 input to three input terminals B2, A21, A22, respectively, as variables, and outputting a result of the logical operation z2.

$$z2=\overline{(a21+a22)\cdot b2} \quad (1)$$

On the other hand, when using the exemplary standard cell 20 as a delay-adjusting cell, B2 is used as a delay input terminal and Z2 is used as an output terminal, and the route between these terminals is used as a signal route having an adjustable delay time. When the exemplary standard cell 20 is used as a delay-adjusting cell, other terminals A21 and A22 (which are used as input terminals when the cell is used as a standard cell) are supplied with respective potentials selected from a plurality of fixed potentials, i.e., a high level potential and a low level potential. The delay time between the delay input terminal B2 and the output terminal Z2 may be adjusted by selecting one of the connection patterns (delay-adjusting cell connection patterns) of connecting the other terminals for supplying respective ones of the fixed potentials.

Figure 3:
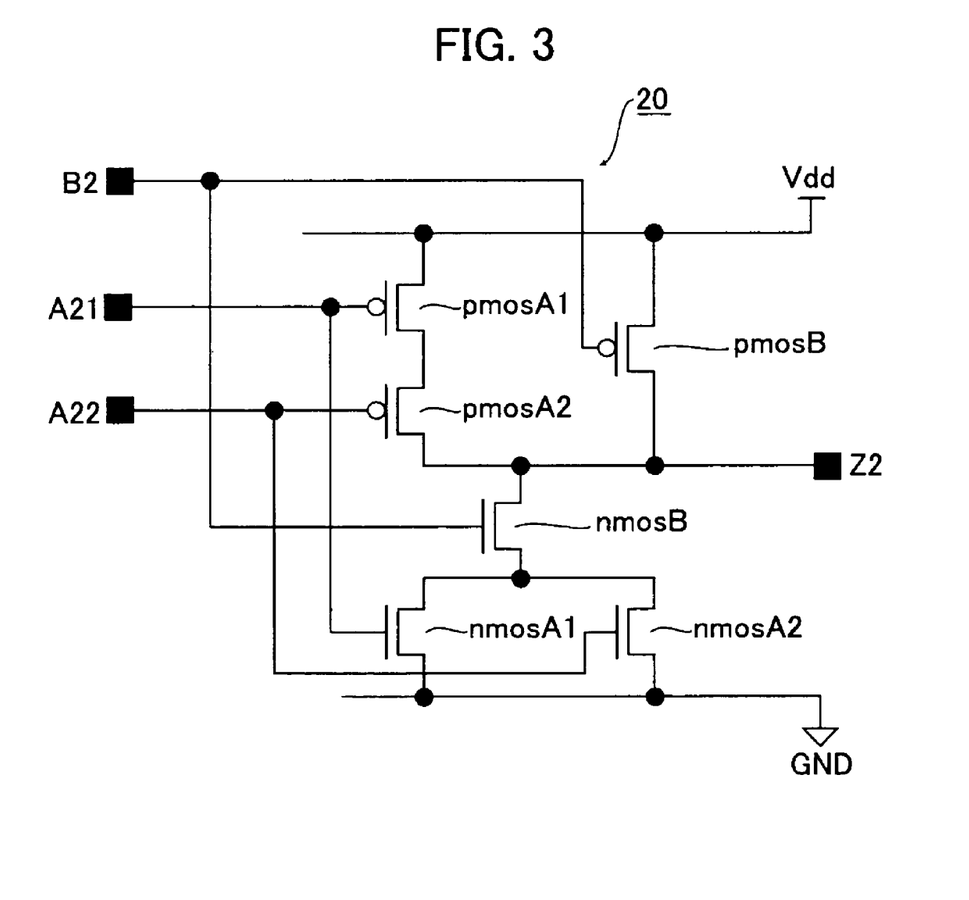
FIG. 3 is an exemplary circuit diagram showing connections between transistors that constitute the cell 20 shown in FIG. 2.

FIG. 3 is an exemplary circuit diagram showing connections between transistors that constitute the cell 20 shown in FIG. 2. The circuit shown in FIG. 3 includes three p-type MOS transistors pmosA1, pmosA2, pmosB and three n-type MOS transistors nmosA1, nmosA2, nmosB. Gates of pmosA1 and nmosA1 are connected to the input terminal A21 and gates of pmosA2 and nmosA2 are connected to the input terminal A22. Further, gates of pmosB and nmosB are connected to the input terminal B2. Between the high voltage supply Vdd and the output terminal Z2, pmosA1 and pmosA2, which are connected in series, are connected in parallel with pmosB. Between the output terminal Z2 and low voltage power supply GND, mosA 1 and nmosA2, which are connected in parallel, are connected in series with nmosB.

In the cell 20 having the circuit construction shown in FIG. 3, for example, when both of the input terminals A21 and A22 are fixed to the high level (Vdd potential), both pmosA1 and pmosA2 are OFF, and both nmosA1 and nmosA2 are ON. On the other hand, when one of A21 and A22 is at the high level and the other one of A21 and A22 is at the low level (GND potential), one of pmosA1 and pmosA2 is ON and the other one is OFF. Further, one of nmosA1 and nmosA2 is ON and the other one is OFF. Accordingly, the resistance between the output terminal Z2 and the low voltage power supply GND connected in series with nmosB when both A21 and A22 are at the high level is lower than the case that one of A21 is at the high level and the other one is at the low level.

As a result, the time required for changing the output terminal Z2 from the high level to the low level when both of A21 and A22 are at the high level is shorter than the case that one of them is at the high level and the other is at the low level. That is, when the signal b2 input to the input terminal B2 changes from the low level to the high level and nmosB changes from OFF to ON, the output terminal Z2 changes from the high level to the low level more rapidly in the case that both A21 and A22 are at the high level than the case that one of A21 and A22 is at the high level and the other one is at the low level.

Further, nmosA1 and nmosA2 are typically placed adjacent to nmosB in the same well on a surface of a semiconductor substrate. Accordingly, states (i.e., ON or OFF) of nmosA1 and nmosA2 influence the operation of nmosB. Similarly, pmosA1 and pmosA2 are typically placed adjacent to pmosB in the same well. Accordingly, states of pmosA1 and pmosA2 influence the operation of pmosB.

Table 1 shows an example set of delay times (times from the change of the level of input signal b2 to the change of the level of output signal z2) for the circuit shown in FIG. 3 constructed with 90 nm-node transistors. Specifically, Table 1 shows delay times when the input signal b2 changes from the low level to the high level and from the high level to the low level for respective connection patterns of the input terminals A21 and A22. Table 1 shows that the delay time may be adjusted with a step of 22 ps or 35 ps by changing the connection pattern when the input signal changes from the low level to the high level. Table 1 also shows that the delay time may be adjusted with a step of 4 ps or 2 ps by changing the connection pattern when the input signal changes from the high level to the low level.

TABLE 1

| Direction of change in input signal level | Connection pattern | Delay time (ps) |
|---|---|---|
| low → high | A21 = high, A22 = high | 123 |
| | A21 = low, A22 = high | 145 |
| | A21 = high, A22 = low | 180 |
| high → low | A21 = high, A22 = high | 135 |
| | A21 = low, A22 = high | 139 |
| | A21 = high, A22 = low | 141 |

As thus explained, the delay-adjusting cell 20 shown in FIGS. 2 and 3 provides a delay time that is adjustable by selecting the connection pattern (delay-adjusting cell connection pattern) with a step of about a few tens of picoseconds to a few picoseconds. On the other hand, a buffer cell, which is constructed with transistors of the same node, has a delay time of, for example, 300 ps or more. Accordingly, the conventional method of adjusting the delay time by adjusting the stage of a serial connection of buffers only allows adjusting the delay time with a step of a few hundreds of picoseconds. Various disclosed exemplary embodiments allow for precisely adjusting the delay time by selecting the connection pattern of the delay-adjusting cell with a step ⅒ or less compared with the conventional technique.

The delay-adjusting cell 20, for which exemplary delay times are shown in Table 1, is not specially designed as a delay-adjusting cell. It does not have a special circuit or a special layout. The delay times shown in Table 1 are obtained by one of a plurality of types of standard cells registered in the cell library 10 having logical functions that are generally required in semiconductor integrated circuits. In practice, in addition to the delay-adjusting cell 20 shown in FIGS. 2 and 3, a plurality of types of standard cells that provide various delay times are selected as the specified types of standard cells from the plurality of types of standard cells registered in the cell library 10. Correspondence between the delay times and the connection patterns for each of the specified types of standard cells is registered in the cell library 10 as delay-adjusting cell data. When designing semiconductor integrated circuits, appropriate cells and connection patters are selected depending on required delay times.

As shown in FIG. 3, the standard cell 20 has a construction of a so-called complex gate. That is, OR gate 22 and NAND gate 24 shown in FIG. 2 are not constructed individually, but are constructed collectively as one complex gate. As a result, the delay time between the input terminal B2 of the NAND gate 24 and the output terminal Z2 may be altered by the connection pattern for connecting the input terminals A21 and A22 of the OR gate 22 to respective ones of fixed potentials with a step of a few tens of picoseconds. Generally, not limited to the cell shown in FIGS. 2 and 3, standard cells having constructions of complex gates may be advantageously used as delay-adjusting cells.

However, depending on required delay times, a standard cell that does not have a construction of complex gate may also be used as a delay-adjusting cell. That is, even in a cell that is constructed by combining an individually-constructed OR gate and NAND gate, a state of each transistor in the cell influences the operation of other transistors that are placed adjacently on the surface of a semiconductor substrate. Accordingly, similar to the case that the input signal changes from the high level to the low level shown in Table 1, the delay time may be changed slightly by changing the connection pattern.

Note that, some of the plurality of patterns for connecting input terminals, other than one used as a delay input terminal, to respective ones of a plurality of fixed potentials (e.g., the high level and the low level) may be unusable as delay-adjusting cell connection patterns.

In the case of the standard cell 20 shown in FIG. 2, the input terminal B2 is used as a delay input terminal, and among the connection patterns for connecting other input terminals A21 and A22 to respective ones of the high and low levels, three patterns shown in Table 1 may be used as delay-adjusting cell connection patterns. In other words, with the three connection patterns shown in Table 1, signal b2 input to the input terminal B2 is output from the output terminal Z2 (after being reversed, in the case of the standard cell 20) as output signal z2 after delay times corresponding to the connection patterns.

On the other hand, with the fourth connection pattern that is not shown in Table 1, i.e., a pattern of connecting both of the input terminals A21 and A22 to the low level, the level of output signal z2 output from the output terminal Z2 does not change even when the level of input signal b2 input to the input terminal B2 changes. That is, the standard cell 20 does not output the signal input to the delay input terminal B2 from the output terminal Z2 when the other input terminals A21 and A22 are connected with the fourth connection pattern. Accordingly, the fourth connection pattern is not usable as a delay-adjusting cell connection pattern to adjust the delay time between the delay input terminal B2 and the output terminal Z2.

Not only the standard cell shown in FIG. 2 but also other standard cells having a plurality of connection patterns for connecting input terminals, other than a delay input terminal, to respective ones of a plurality of fixed potentials as delay-adjusting cell connection patterns may be used as delay-adjusting cells. In other words, each standard cell having a plurality of connection patterns that outputs a signal input to a delay input terminal from an output terminal after delay times corresponding to the respective connection patterns may be used as a delay-adjusting cell.

Figure 4:
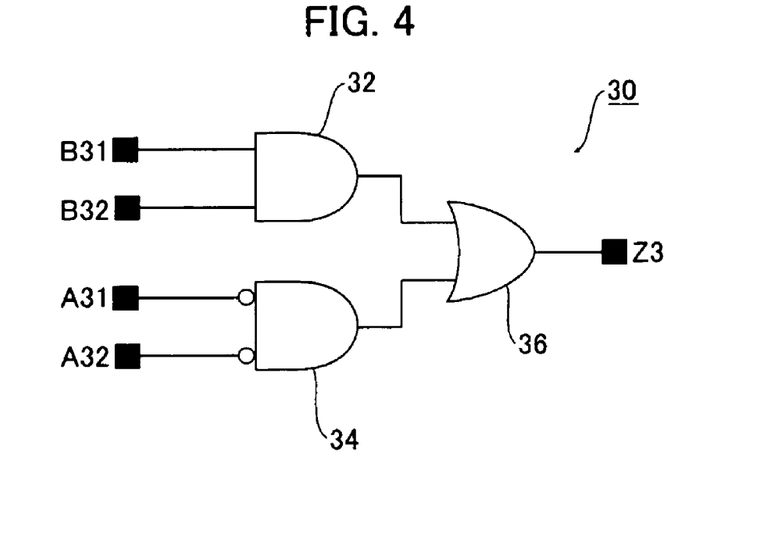
FIG. 4 is a logical circuit diagram of an exemplary standard cell that can be used as a load-capacitor cell.

FIG. 4 is a logical circuit diagram of an exemplary second specified type standard cell that can be used as a load-capacitor cell.

The standard cell 30 shown in FIG. 4 is constructed with an AND gate 32 having two input terminals B31 and B2, a negative-logic AND gate 34 having two input terminals A31 and A32, and an OR gate 36 to which the outputs from two AND gates 32 and 34 are input. The output of the OR gate 36 is used as the output terminal Z3 of the cell 30. When using the cell 30 as a standard cell, an output signal z3 generated from input signals input to the four input terminals B31, B32, A31, and A32 according to the following equation (2) is output from the output terminal Z3.

$$z3 = b31 \cdot b32 + \overline{a31} \cdot \overline{a32} \qquad (2)$$

On the other hand, when using the standard cell 30 as a load-capacitor cell, capacitances of respective input terminals are utilized. Each of the input terminals B31, B32, A31, and A32 is connected to a gate of one or more transistors that constitute the AND gates 32 and 34, although an exemplary arrangement of transistors within the standard cell 30 is not shown here. Thus, each of the input terminals has an input capacitance determined by the gate capacitances of the transistors. Accordingly, by connecting the input terminals of the cell 30 to a node on the signal route with an appropriate connection pattern (load-capacitor cell connection pattern), it is possible to connect a load capacitor of a capacitance determined by the connection pattern.

As thus explained, the standard cell shown in FIG. 4 may provide a load capacitor connected to any desired node on the signal route with a capacitance that can be adjusted by selecting a pattern for connecting the four input terminals B31, B32, A31, and A32 (load-capacitor cell connection pattern) to the node. When all of the four input terminals B31, B32, A31, and A32 have the same input capacitance, capacitance of the load capacitor is adjustable in four levels by selecting the number of input terminals connected to the node (or in five levels including the case that none of the input terminals is connected). When the capacitances of the four input terminals are different from each other, it is possible to provide a load capacitor connected to any desired node with a capacitance selectable from a larger number of levels.

By connecting a load capacitor with an adjustable capacitance to a desired node on the signal route in a logic circuit, it is possible to provide an adjustable delay time to the node. Specifically, for example, by connecting a load-capacitor cell constructed with 90 nm-node transistors to an output terminal of a standard cell constructed with 90 nm-node transistors, it is possible to provide a delay time adjustable with a step of about 30 ps. That is, selecting the connection pattern of a load-capacitor cell also allows for precisely adjusting the delay time with a step of about 1/10 compared with the case of selecting a number of stages of buffer cells.

In practice, a plurality of types of cells that provide various load capacitances are selected as specified types of cells from the standard cells registered in the cell library 10, and a correspondence of the capacitances and the connection patterns (load-capacitor cell connection patterns) for each of the specified types of cells is registered in the cell library 10 as load-capacitor cell data. During designing a semiconductor integrated circuit, appropriate cells and respective connection patterns are selected depending on required capacitances of load capacitors.

When using the standard cell 30 shown in FIG. 4 as a load-capacitor cell, input terminals not connected to the node on the signal route are connected to fixed potentials. In this manner, generation of feedthrough current in the cell 30 is prevented. On the other hand, output terminal Z3 may be left unconnected in the case of the cell 30 shown in FIG. 4.

Figure 5:
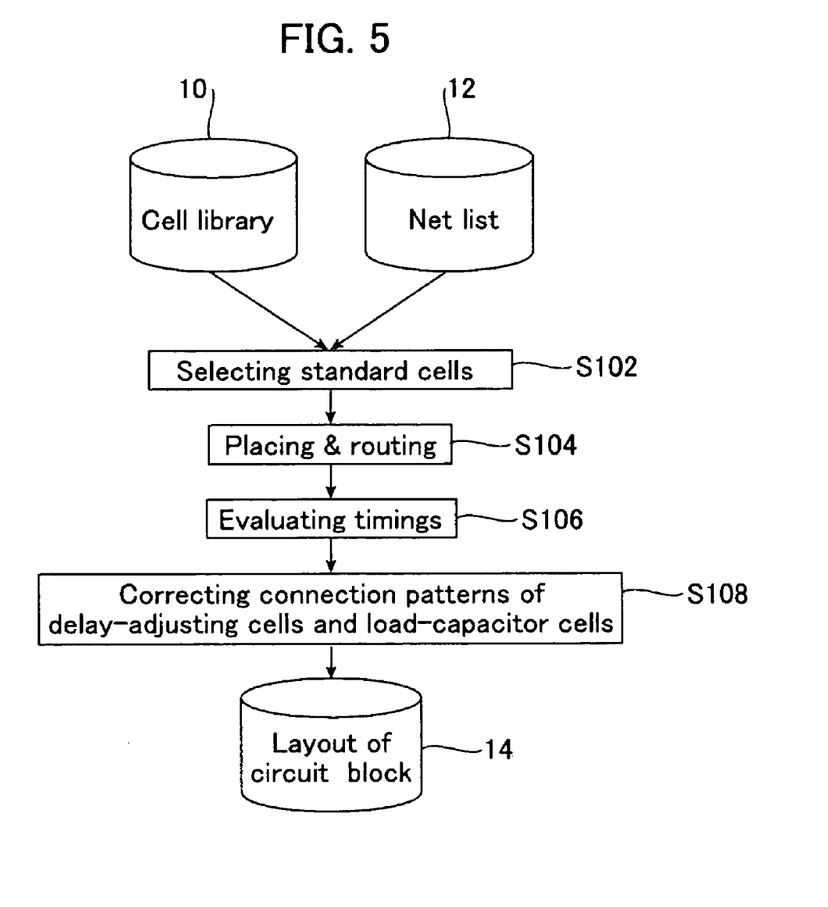
FIG. 5 is a flow chart showing an exemplary method of designing semiconductor integrated circuit.

FIG. 5 is a flow chart showing an exemplary method of designing semiconductor integrated circuit.

Firstly, circuit information necessary to realize the function of a semiconductor integrated circuit to be designed is input as a form of, for example, net-list. A plurality of types of standard cells that are required to construct the circuit described by the net-list is selected from the cell library 10 (S102). At this step, in addition to selecting a plurality of types of standard cells in order to utilize their logical functions, other types of standard cells are also selected in order to utilize them as delay-adjusting cells and/or load-capacitor cells. In other words, among specified types of standard cells for which the cell library stores delay-adjusting cell data or load-capacitor cell data in addition to standard cell data, at least one type of standard cell is selected depending on a required delay time.

Then, one or more of each of the selected types of standard cells are placed and routed with each other (S104). In the pacing, layouts of one or more of each of the standard cells are generated based on the layout data of each of the selected types of standard cells, and placed in a chip area of the semiconductor integrated circuit, or, more exactly, in a memory area provided in a CAD (Computer-Aided Design) system for generating the layout data of the semiconductor integrated circuit. In the routing, placed standard cells are routed with each other to form logic circuits having respective signal routes. In this manner, layout data of a circuit block including one or more logic circuits is generated.

Further, in the placing and routing step, a delay-adjusting cell is placed based on the layout data for the specified type standard cell and the delay input terminal and the output terminal of the delay-adjusting cell are connected to different nodes on the signal route such that the delay-adjusting cell forms a part of the signal route. Additionally, connection pattern of the other input terminals is set such that a required delay time is provided between the delay input terminal and the output terminal. That is, by referring to the correspondence between the delay times and the connection patterns (delay-adjusting cell connection patterns) stored in the cell library as the delay-adjusting cell data, an appropriate one of the connection patterns is selected and the other input terminals are connected according to the selected pattern.

In addition, a load-capacitor cell is placed based on the layout data for the second specified type standard cell and is connected to a node on the signal route, to which a delay time is required to be added by connecting a load capacitor, with a connection pattern that provides a required load capacitance. That is, by referring to the correspondence between the load capacitances and the connection patterns (load-capacitor cell connection patterns) stored in the cell library as the load-capacitor cell data, an appropriate one of the connection patterns is selected and the load-capacitor cell is connected according to the selected connection pattern.

The require delay time used in the placing and routing step may be, for example, calculated using approximate lengths of interconnections between the standard cells and may include some error.

Thereafter, a simulation is conducted using arrangements of the cells and lengths of interconnections between the cells, and operational timings of logic circuits within the circuit block are evaluated (S106), and portions of the logic circuits where the timing requirements are not satisfied are identified. Then, connection patterns of delay-adjusting cells and/or load-capacitor cells in the identified portions are corrected so that the timing requirements are satisfied (S108). Accordingly, a layout data 14 of the circuit block in the state that the timing adjustment is completed is generated.

In the correction step, a connection pattern where none of the input terminals is connected to the node in the signal route may be selected for a load-capacitor cell. That is, in the placing and routing step S104, necessity of placing and connecting load-capacitor cells is determined based on required delay times that may include some errors. Accordingly, in the correcting step S108, the timing evaluation may reveal that it is not required to connect load-capacitor cells to some of the nodes, to which load-capacitor cells are placed and connected in the placing and routing step S104.

Further, in the placing and routing step S104, some of the load-capacitor cells may be placed without connecting their input terminals to any of the nodes. That is, especially for nodes with small timing margins, the result of evaluation in the evaluating step S106 may reveal that it is required to connect load capacitors to the nodes, even if it was determined in the placing and routing step S104 that it was not required. In order to make it possible to connect load-capacitor cells by correcting connection patterns in the correcting step S108, it is preferable to place load-capacitor cells near, for example, the nodes with small timing margins without connecting their input terminals. In other words, in the placing and routing step S104, a connection pattern where none of the terminals is connected may be selected for some of the load-capacitor cells.

Finally, the layout data generated by the flow described above is combined with layout data of other blocks such as memory blocks, which are designed without utilizing the standard cells, and input/output circuit blocks, or the like. Thus, layout data of the whole semiconductor integrated circuit is generated, and the design of the semiconductor integrated circuit is completed. Thereafter, masks are produced in accordance with the generated layout data, and semiconductor integrated circuits are fabricated on surfaces of semiconductor substrates using the masks.

As thus explained, according to the exemplary embodiment of designing semiconductor integrated circuits shown in FIG. 5, timing adjustment may be performed in the correcting step S108 by correcting the connection patterns of delay-adjusting cells and/or load-capacitor cells. The correction of connection patterns may be performed by merely correcting interconnections between the terminals of delay-adjusting cells and the fixed potentials and/or between the terminals of load-capacitor cells and the nodes on the signal route. That is, the correction may be performed without altering arrangements of the cells.

In the conventional method of designing semiconductor integrated circuits, delay time adjustment is made by adjusting a number of stages of serially connected buffers. In this case, when it is found by the timing evaluation that additional buffers are required to be placed and connected, for example, arrangements of other standard cells that were already placed must be changed. The change in the arrangement changes the lengths of interconnections between the standard cells. The change in the lengths of interconnections may cause timing violations in different portions, and necessitate further timing adjustments. Accordingly, timing adjustment may require a long time in the conventional method of designing semiconductor integrated circuits.

In the exemplary method of designing semiconductor integrated circuit according to this disclosure, as shown in exemplary manner in FIG. 5, on the other hand, the delay time may be adjusted without changing layouts of the cells. Accordingly, the timing adjustment may be completed within a short time. The exemplary method of designing semiconductor integrated circuits shown in FIG. 5 may be performed using a CAD system comprising the standard cell library 10, and various means or program units for performing the steps S102 to S108.

Figure 6:
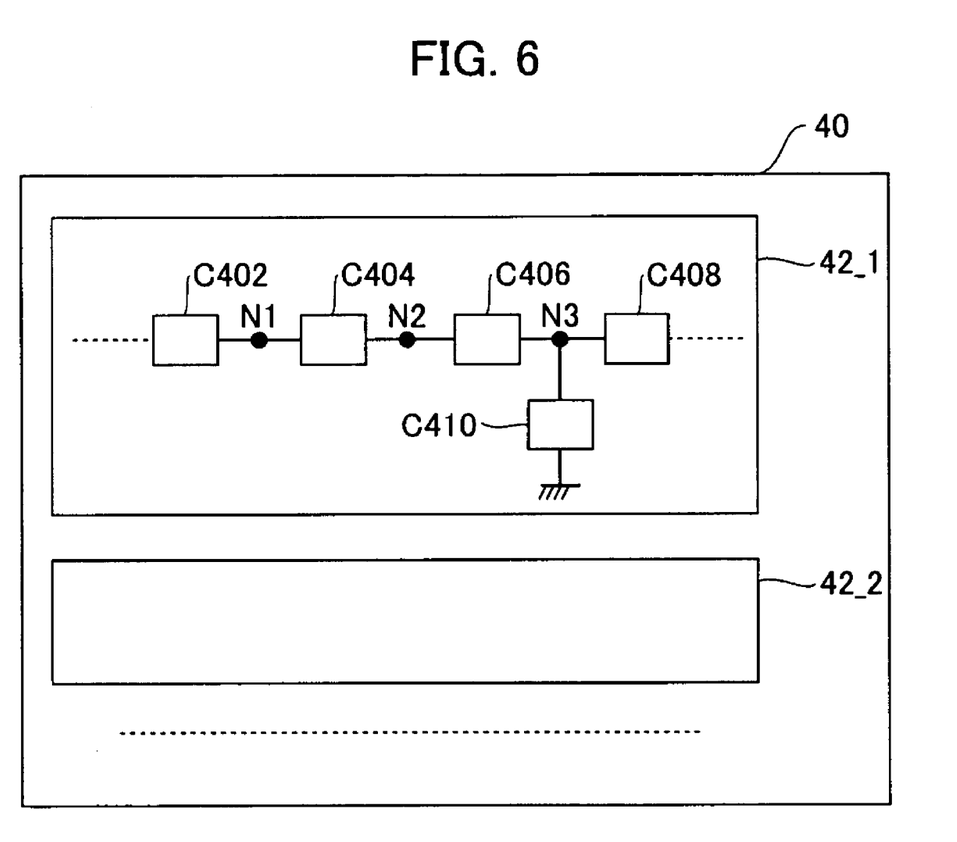
FIG. 6 is a schematic drawing showing an exemplary construction of a circuit block provided in an exemplary semiconductor integrated circuit.

FIG. 6 is a schematic drawing showing an exemplary construction of a circuit block provided in an exemplary semiconductor integrated circuit.

The circuit block 40 includes a plurality of logic circuits 42_1, 42_2, . . . . These logic circuits are constructed with respective pluralities of types of standard cells selected from the cell library 10. In the exemplary embodiment shown in FIG. 6, the logic circuit 42_1 is constructed with the standard cells C402, C404, C406, C408, C410, or the like, which are connected with each other to form a signal route having nodes N1, N2, N3, . . . . The logic circuit 42_1 utilizes some of the standard cells as standard cells by connecting them with connections such that the cells perform respective logical functions. The logic circuit 42_1 further utilizes some of the other standard cells as delay-adjusting cells and/or load-capacitor cells by connecting them with connections such that the cells provide delays in the signal route.

Consider a case that cell C404 is used as a delay-adjusting cell, cell C410 is used as a load-capacitor cell, and the other cells C402, C406, C408 are used as standard cells. In this case, the delay-adjusting cell C404 is connected between the nodes N1 and N2 on the signal route in the logic circuit 42_1 and forms a part of the signal route. Accordingly, a delay time adjustable with the connection pattern of the delay-adjusting cell C404 is provided between the nodes N1 and N2. The load-capacitor cell C410 is connected to the node N3 of the logic circuit 42_1. Accordingly, a delay time is provided to the node N3 by connecting a load capacitance adjustable with the connection pattern of the load-capacitor cell C410. In other words, the load capacitance of the standard cell C406 that drives the node N3 is adjusted and the delay time of the standard cell C406 is adjusted by selecting the connection pattern of the load-capacitor cell C410.

In the exemplary construction shown in FIG. 6, all standard cells except for the standard cell C410, which is used as a load-capacitor cell, are connected in series to form a straight signal route. In practice, however, combining various types of standard cells often forms a signal route that branches and merges in various ways. Timings of signals in a logic circuit having a signal route that branches and merges should be unified in order to ensure a proper operation. Specifically, it is necessary to unify timings of a plurality of signals that arrive at a common node where the signal route merges.

In the exemplary semiconductor integrated circuit shown in FIG. 6, timings of signals within logic circuits may be precisely unified because delay-adjusting cells and load-capacitor cells allow timing adjustment with small timing steps. Accordingly, the exemplary semiconductor may operate at a high frequency.

Although not shown in the drawing, it is common to construct each of the logic circuits 42_1 and 42_2 by alternately placing combinational logic circuits and flip-flops so that the logic circuits operate in synchronous with a clock signal supplied to the flip-flops. In such synchronous logic circuit, output data signals output from combinational logic circuits in the preceding stage are held in flip-flops at the timing of the clock signal, and are supplied as input data signals to combinational logic circuits in the following stage. In this case, it is common that a clock tree is provided such that the clock signal is supplied simultaneously to all flip-flops in the logic circuit.

The delay-adjusting cell and the load-capacitor cell may be used to adjust and unify the timings of data signals in the signal route, and may also be used to adjust and unify the timings of the clock signal in the clock tree, which is the route of the clock signal.

In the exemplary semiconductor integrated circuit according to this invention shown in FIG. 6, cells that are registered in the cell library 10 as standard cells are used as delay-adjusting cells. Accordingly, it is common that the same type of cell is used as a delay-adjusting cell in the logic circuit 42_1 and is also used as a standard cell in the same logic circuit 42_1 or in another logic circuit that constitute the circuit block 40. The situation is the same for the load-capacitor cell. That is, it is common that the same type of cell is used as a load-capacitor cell in the logic circuit 42_1 and is also used as a standard cell in the same logic circuit 42_1 or in another logic circuit that constitutes the circuit block 40.

The delay-adjusting cell is connected with a connection pattern selected from a plurality of connection patterns in order to provide a necessary delay time. Similarly, the load-capacitor cell is connected with a connection pattern selected from a plurality of connection patterns in order to provide a necessary load capacitance. Accordingly it is common that the same type of delay-adjusting cell is used with different connection patterns to provide different delay times at different portions in the same circuit block. Similarly, the load-capacitor cell is connected with a connection pattern selected from a plurality of connection patterns in order to provide a necessary load capacitance. Accordingly, it is common that the same type of load-capacitor cell is used with different connection patterns to provide different load capacitances at different portions in the same circuit block.

Figure 7:
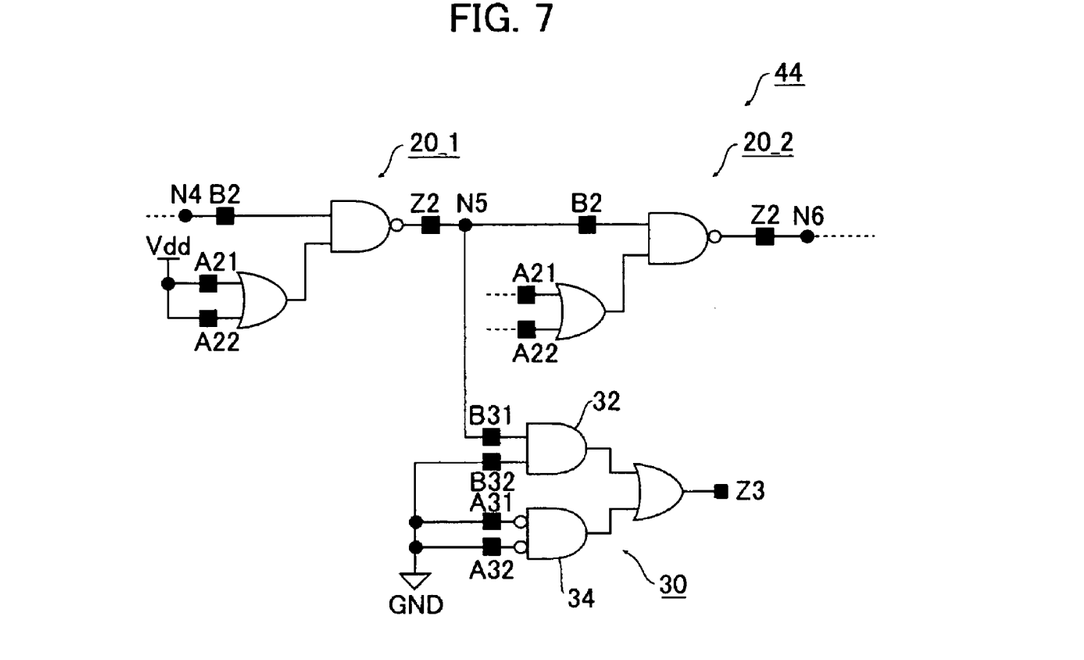
FIG. 7 is a circuit diagram showing a first example of a portion of an exemplary logic circuit.
Figure 8:
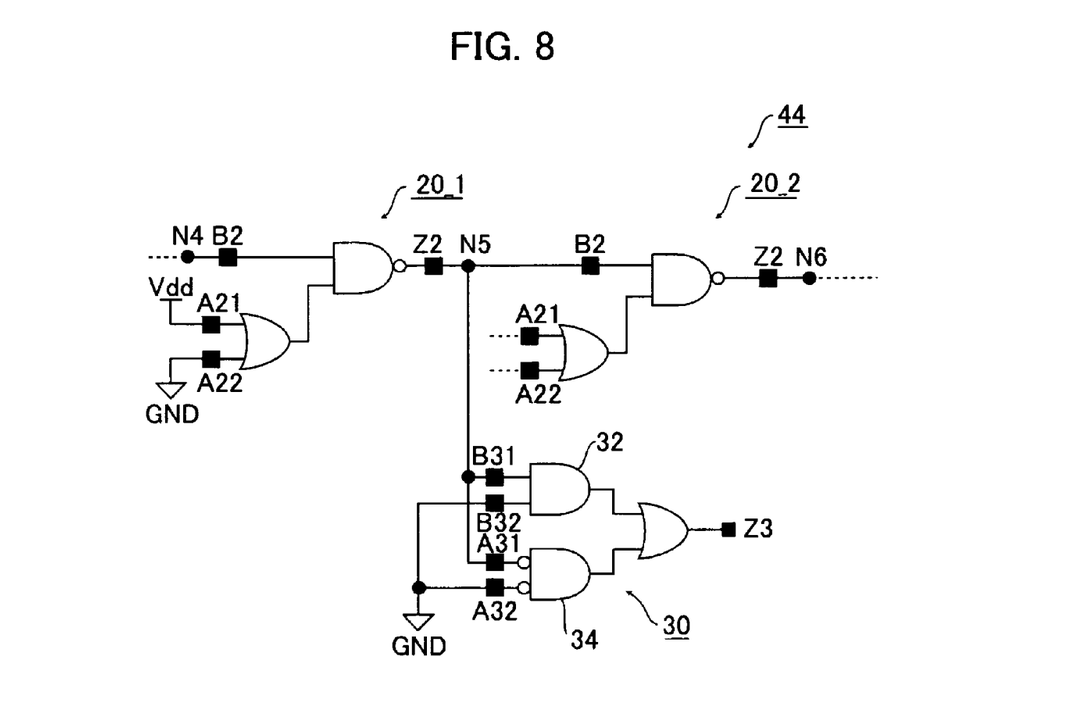
FIG. 8 is a circuit diagram showing a second example of a portion of an exemplary logic circuit.

FIGS. 7 and 8 are circuit diagrams showing a first and a second example of a portion of an exemplary logic circuit constructed by placing and routing the first standard cell 20 shown in FIGS. 2 and 3 and the second standard cell 30 shown in FIG. 4.

The portion of logic circuit 44 shown in FIG. 7 or 8 includes two of the first standard cell 20 (20_1 and 20_2) shown in FIG. 2 and one of the second standard cell 30 shown in FIG. 4. The two first standard cells 20_1 and 20_2 are connected in series. That is, the input terminal B2 of the standard cell 20_1 in the preceding stage is connected to the node N4 on the signal route of the logic circuit 44 and the output terminal thereof Z2 is connected to another node N5 on the signal route. And the input terminal B2 of the standard cell 20_2 in the following stage is connected to the node N5 and the output terminal thereof Z2 is connected to another node N6 on the signal route.

The standard cell 20_1 is used as a delay-adjusting cell that provide a delay time between the nodes N4 and N5 by inputting an input signal (which may be supplied from a preceding stage in the same logic circuit 44 or from another circuit not shown in FIGS. 7 and 8) and by supplying fixed potentials to the other input terminals A21 and A22. On the other hand, the standard cell 20_2 is used as a standard cell that performs the logical function according to equation (1) by inputting an input signal to the input terminal B2 and also inputting respective input signals to the other input terminals A21 and A22.

In the circuits shown in FIGS. 7 and 8, the connection patterns for the standard cell 20_1, which is placed in the preceding stage and is used as a delay-adjusting cell, are different from each other. As a result, the delay-adjusting cell 20_1 provides different delay times in the logic circuit 44 shown in FIGS. 7 and 8. That is, in the circuit shown in FIG. 7, the high level (Vdd) fixed potential is supplied to both of the input terminals A21 and A22. In the circuit shown in FIG. 8, on the other hand, the high level (Vdd) fixed potential is supplied to the input terminal A21 and the low level (GND) fixed potential is supplied to the input terminal A22. Accordingly, the delay-adjusting cell 20_1 in the circuit shown in FIG. 8 provides a longer delay time than the delay time provided by the delay-adjusting cell 20_1 in the circuit shown in FIG. 7.

The second standard cell 30 is used as a load-capacitor cell that connects a load capacitance to the node N5 between the standard cells 20_1 and 20_2. That is, in the circuit shown in FIG. 7, one input terminal B31 among the four input terminals of the load-capacitor cell 20_2 is connected to the node N5. On the other hand, in the circuit shown in FIG. 8, two input terminals B31 and A31 among the four input terminals are connected to the node N5. Accordingly, a larger load capacitance is connected to the node N5 in the case of the circuit shown in FIG. 8 than the case of the circuit shown in FIG. 7. For example, if the input capacitances of the input terminals B31 and A31 are the same, two times larger capacitance is connected to the node N5 in the circuit shown in FIG. 8 than the capacitance connected to the same node in the circuit shown in FIG. 7.

As explained above, connection patterns of the input terminals of the delay-adjusting cell 20_1 are different from each other, and load capacitances connected by the load-capacitor cell 30 are also different from each other in the circuits shown in FIGS. 7 and 8. According to these differences, the delay-adjusting cell 20_1 provides a longer delay time to the signal route in the circuit shown in FIG. 8 than the delay time provided to the signal route in the circuit shown in FIG. 7.

In the exemplary circuits shown in FIGS. 7 and 8, the low level fixed potential is supplied to the input terminals of the cell 30 which are not connected to the node N5. For example, in both of the circuits shown in FIGS. 7 and 8, one input terminal B31 of the AND gate 32 is connected to the node N5 and the other input terminal B32 thereof is connected to the low level fixed potential. Accordingly, the output of the AND gate 32 is fixed to the low level regardless of the potential of the node N5.

On the other hand, in the exemplary circuit shown in FIG. 8, one input terminal A31 of the negative-logic AND gate 34 is connected to the node N5 and the other input terminal A32 thereof is connected to the low level fixed potential. Accordingly, the output of the negative-logic AND gate 34 in the circuit shown in FIG. 8 changes between the low level and the high level depending on the potential of the node N5, and the negative-logic AND gate 34 consumes power when it changes the state. In order to prevent the power consumption due to the change of the state, it is preferable to connect the input terminal A32 to the high level fixed potential.

When using standard cells other than the standard cell 30 shown in FIG. 4 as load-capacitor cells, levels of the fixed potentials supplied to the input terminals that are not connected to the node in the signal route should preferably be selected appropriately in order to reduce power consumptions in the load-capacitor cells.

In the case of the delay-adjusting cell 20_1, delay-adjusting cell data that allows assessing correspondence between delay times and connection patterns is stored in the cell library. Accordingly, the connection pattern of the input terminals A21 and A22 other than the delay input terminal B2 may be selected by referring to the delay-adjusting cell data such that a required delay time is provided.

In the case of the load-capacitor cell 30, the load-capacitor cell data stored in the cell library 10 allows assessing correspondence between load capacitances and connection patterns of the input terminals B31, B32, A31, and A32. However, the load-capacitor cell data does not allow directly assessing the correspondence between delay times and connection patterns. Accordingly, the connection pattern of the load-capacitor cell is selected as follows, for example.

Firstly, a simulation is conducted to evaluate the delay time of a signal route including the node N5 to which the load-capacitor cell 30 is connected. For example, delay time of the route between the nodes N4 and N6 including the delay times of the cells 20_1 and 20_2, and the interconnections on the signal route is evaluated. At this step, the delay time is evaluated for two different connection patterns of the load-capacitor cell 30 that provide different load capacitances. Next, the load capacitance that would provide a desired delay time is calculated from the two evaluated delay times assuming, for example, a linear relationship between the delay time and the load capacitance connected by the load-capacitor cell. Then, the connection pattern is selected such that the calculated load capacitance is provided.

It is also possible to store in the cell library 10, for the specified type of cell to be utilized as a delay-adjusting cell, correspondences between delay times and connection patterns (delay-adjusting cell connection patterns) for different load capacitances as delay-adjusting cell data. That is, the delay-adjusting cell data may include, in addition to the correspondence between delay times and connection patterns for a standard load capacitance connected to the output terminal, correspondences between the delay times and connection patterns for one or more different load capacitances provided by connecting the load-capacitor cell 30 with different connection patterns. By connecting the load-capacitor cell 30 to the node N5 to which the output terminal of the delay-adjusting cell 20_1 is connected, as shown in FIGS. 7 and 8, and by storing the delay-adjusting cell data for different load capacitances, the connection patterns of the delay-adjusting cell 20_1 and the load-capacitor cell 30 may be easily selected by referring to the delay-adjusting cell data.

In the exemplary semiconductor integrated circuit according to this invention, however, it is not necessary to use a delay-adjusting cell in combination with a load-capacitor cell connected to the output terminal of the delay-adjusting cell. That is, a delay-adjusting cell may be used without connecting a load-capacitor cell to the output terminal thereof. Also, a load-capacitor cell may be used to connect a load capacitance to a standard cell that is not used as a delay-adjusting cell. In this case, the connection pattern of the load-capacitor cell may be selected by evaluating delay times for two connection patterns, as explained above.

It is also possible to use delay-adjusting cells and load-capacitor cells according to exemplary embodiments of this disclosure in combinations of other types of delay circuits, such as a delay circuit formed by connecting a plurality of buffers in series. For example, delay circuits with serially-connected buffers may be used as course adjusting cells to adjust delay times with large steps, while delay-adjusting cells and load-capacitor cells may be used as fine adjusting cells to adjust delay times with small steps.

Figure 9:
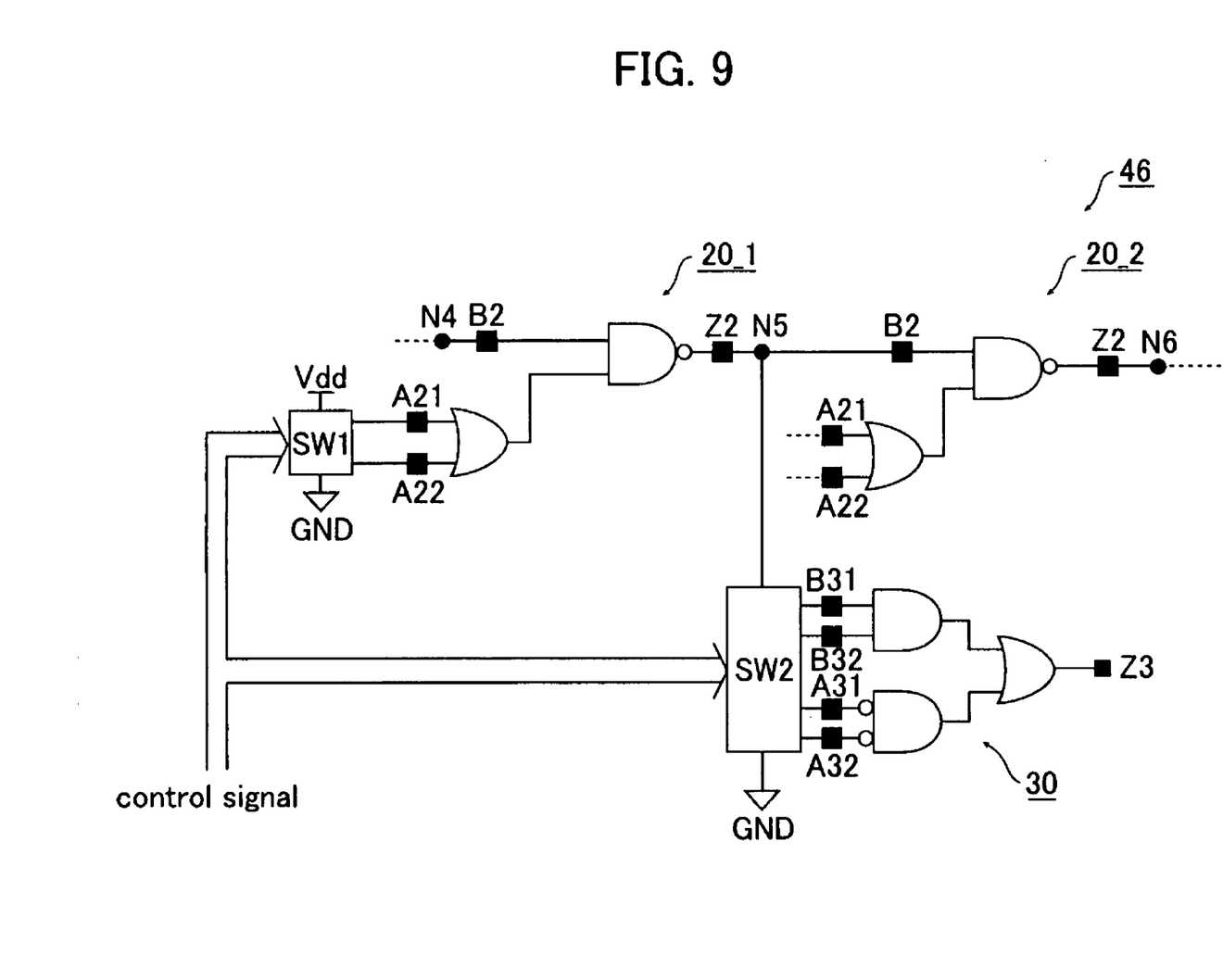
FIG. 9 is a circuit diagram showing a third example of a portion of an exemplary logic circuit.

FIG. 9 is a circuit diagram showing a part of another exemplary logic circuit constructed with first standard cells 20_1 and 20_2 and a second standard cell 30, similar to the logic circuits shown in FIGS. 7 and 8.

In the case of the exemplary logic circuits shown in FIGS. 7 and 8, the delay adjusting cell 20_1 and the load capacitor cell 30 are connected with fixed interconnections in the placing and routing step S104 in the design flow shown in FIG. 5. In the exemplary logic circuit shown in FIG. 9, on the other hand, switches that can set connections of the delay-adjusting cell 20_1 and the load-capacitor cell 30 by a control signal are placed in the placing and routing step S104. That is, in the exemplary logic circuit 46 shown in FIG. 9, a first switch SW1 for selecting the connection pattern of the delay-adjusting cell 20_1 and a second switch SW2 for selecting the connection pattern of the load-capacitor cell 30 are placed.

The first switch SW1 selects a connection pattern, or levels of fixed potentials supplied to the input terminals A21 and A22, of the delay-adjusting cell 20_1. Thereby, delay time of the delay-adjusting cell 20_1 is adjusted. The second switch SW2 selects a connection pattern of the load-capacitor cell, or connects selected ones of the input terminals B31, B32, A31, and A32 to the node N5 and supplies the fixed potential (GND potential) to the other ones of the input terminals. Thereby, load capacitance that the load-capacitor cell 30 connects to the node N5 is adjusted.

After conducting a timing evaluation of the logic circuit in a semiconductor integrated circuit after the integrated circuit is actually fabricated on a semiconductor substrate, or after the fabricated integrated circuit is mounted on a circuit board, the connection patterns may be corrected and the delay time may be adjusted using the switches. In this case, the evaluating step S1106 in the flow shown in FIG. 5 is performed after fabricating the semiconductor integrated circuit, or after mounting the fabricated semiconductor integrated circuit. Thereafter, the correcting step S108 is performed to correct the connection pattern depending on the result of evaluation by using the switches.

Fuses, or pass-transistors controlled by various types of memories, for example, may be used as the switches SW1 and SW2.

Thus far, various exemplary semiconductor integrated circuits are explained in detail with reference to specific embodiments. These embodiments are meant to be illustrative and not limiting. Various modifications and improvements are contemplated within the scope of this disclosure.

In the disclosed exemplary embodiments, specified types of standard cells are selected for using as delay-adjusting cells and load-capacitor cells from a plurality of types of standard cells that are already registered in the cell library. Correspondences between delay times or load capacitances and connection patterns are evaluated for the selected types of cells using, for example, a simulation. The correspondences are stored in the library as delay-adjusting cell data or load-capacitor cell data. The delay time should preferably be evaluated using a simulation, because the delay time depends not only on the circuit construction but also on the arrangement of transistors on the surface of a semiconductor substrate. Nonetheless, evaluation of the delay time by a simulation may be easily conducted for standard cells that are already registered in a cell library. That is, a correspondence between delay times or load capacitances and connection patterns for a standard cell registered in a cell library may be evaluated by conducting a simulation using the layout data stored in the library.

Even if the simulation indicates that a standard cell to which the simulation is directed does not have a desired correspondence, it is only required to conduct a simulation for another cell. When the data necessary for using a cell as a delay-adjusting cell or a load-capacitor cell is obtained, the data may be additionally stored in the cell library in which layout data or other data required for using the cell as a standard cell is already stored.

On the contrary, significant time and effort are needed to register a new cell in a cell library, which is used exclusively for adjusting the delay time, as a new standard cell. Firstly, layout of the new cell is designed. The design should meet various rules so that the new cell may be acceptable as a standard cell. The design should be examined using a design-rule checking program, and corrections of portions where design-rule violation is discovered should be made. It is not infrequent that multiple cycles of examination and correction are required. Simulation of delay time or capacitance may be conducted after the completion of the layout design that meets the rules. Further, when a desired correspondence between delay time or capacitance and connection pattern is not obtained, it is necessary to return to the step of designing the layout. Furthermore, registering the new cell in the cell library is not easy even if it is confirmed that the cell has a desired correspondence. That is because the library does not contain any data concerning the new cell, a complete set of data should be registered. More specifically, not only the data regarding the delay time or capacitance, but also various other data such as the layout data required for using the cell as a standard cell, should be registered in the library.

In sum, according to the disclosed exemplary embodiments, specified types of standard cell are selected among a plurality of types of standard cells that are already registered in the cell library, and the delay-adjusting cell data or the load-capacitor cell data for the selected types of cells is stored in the cell library in addition to the standard cell data that is already stored in the library. This procedure may be conducted far easier than the procedure required for registering new cells that are used exclusively for adjusting delay times.

The delay-adjusting cell or the load-capacitor cell is not limited to the cell shown in FIGS. 2 and 3, or in FIG. 4. Various cells that are generally used as standard cells may be used. That is, any standard cell having a plurality of input terminals may be used as a load-capacitor cell. Further, any cell having a plurality of connection patterns for connecting a plurality of input terminals other than a delay input terminal to respective ones of a plurality of fixed potentials, with which a signal input to the delay input signal is output from an output terminal after respective delay times corresponding to the plurality of connection patterns, may be used as a delay-adjusting cell.

Figure 10:
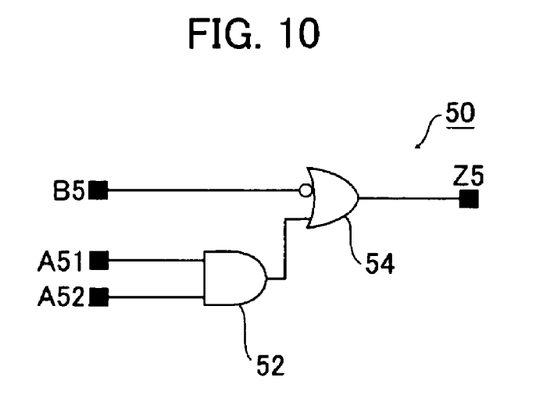
FIG. 10 is a logical circuit diagram showing another exemplary standard cell that can be used as a delay-adjusting cell.
Figure 11:
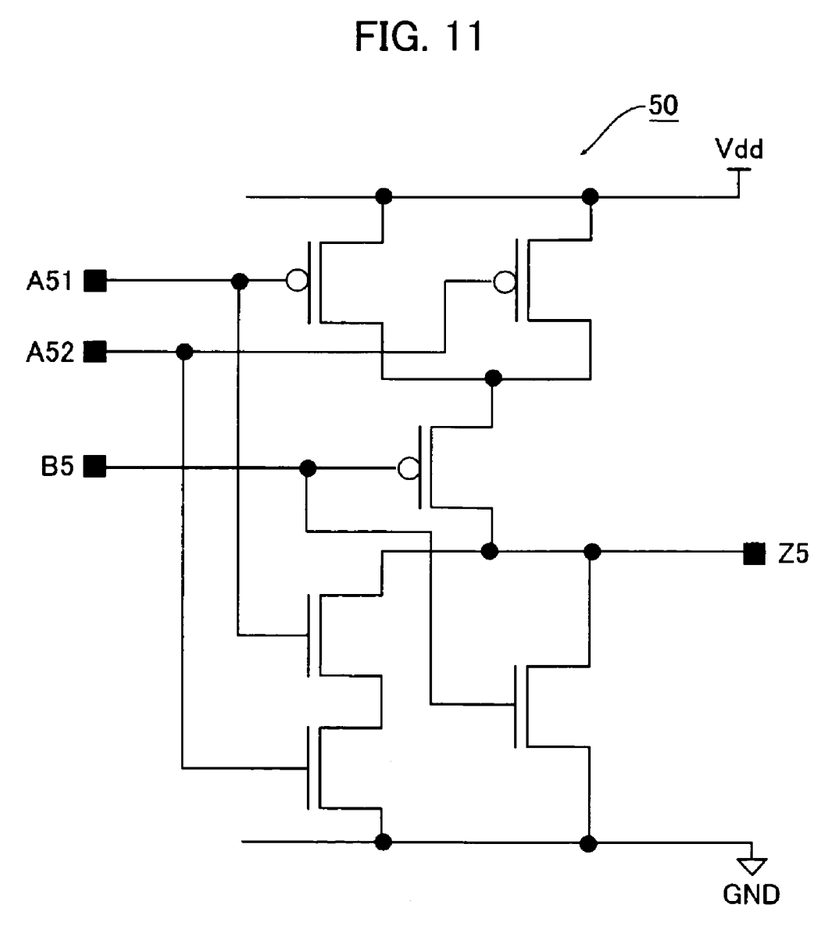
FIG. 11 is an exemplary circuit diagram showing connections between transistors within the exemplary standard cell shown in FIG. 10.

For example, FIG. 10 is a logical circuit diagram showing another exemplary standard cell 50 that can be used as a delay-adjusting cell, and FIG. 11 is a circuit diagram showing connections between transistors within the exemplary standard cell 50. The standard cell 50 shown in FIGS. 10 and 11 is constructed with an AND gate 52 having two input terminals A51 and A52, and an OR gate 54 having a negative-logic input terminal B5 and another input terminal connected to the output terminal of the AND gate 52. The output terminal of the OR gate 54 forms the output terminal Z5 of the cell 50. When the connection pattern of the input terminals A51 and A52 is one of (low, low), (low, high), and (high, low), the delay-adjusting cell 50 inverts and outputs a signal input to the input terminal B5 from the output terminal Z5 after a delay time corresponding to the connection pattern.

As shown in FIG. 11, the standard cell 50 also has a construction of a complex gate. It can adjust the delay time with steps of a few tens of picoseconds by selecting the connection pattern.

A cell having the same construction except that the input terminal B5 is a positive-logic input terminal may also be used as a delay-adjusting cell. In this case, a signal input to the input terminal B5 is output, without being inverted, from the output terminal Z5 when the connection pattern of the input terminals A51 and A52 is one of (low, low), (low, high), and (high, low) after a delay time corresponding to the connection pattern.

As explained above, according to various exemplary embodiments of standard cell libraries, at least one of delay-adjusting cell data and load-capacitor cell data is stored for a specified type standard cell in addition to the standard cell data. Designing a semiconductor integrated circuit using the exemplary standard cell library enables use of the specified type standard cell not only as a standard cell but also as a delay-adjusting cell or a load-capacitor cell. Accordingly, precise adjustment of delay times during designing the semiconductor integrated circuit is enabled without requiring registering a new standard cell in the cell library.

According to various exemplary embodiments of methods of designing semiconductor integrated circuits, a specified type standard cell selected from a cell library is utilized as a delay-adjusting cell or a load-capacitor cell. Accordingly, precise adjustment of delay times during designing the semiconductor integrated circuit is enabled without requiring registering a new standard cell in the cell library.

According to various exemplary embodiments of semiconductor integrated circuits of this invention, a specified type standard cell is utilized not only as a standard cell but also as a delay-adjusting cell or a load-capacitor cell. Accordingly, precise adjustment of delay times in the semiconductor integrated circuit is enabled without requiring registering a new standard cell in the cell library.

What is claimed is:

1. A method of designing semiconductor integrated circuit, comprising:
    preparing a standard cell library in a CAD system, the standard cell library comprising standard cell data including logical function data and layout data for each of a first plurality of types of standard cells and one of a delay-adjusting cell data and load capacitor cell data for a specified type standard cell among the first plurality of types of standard cells, wherein:
    the specified type standard cell has a plurality of input terminals and an output terminal,
    the delay-adjusting cell data allows assessing correspondence between
        i) delay times between a delay input terminal selected from the plurality of input terminals and the output terminal, and
        ii) a plurality of delay-adjusting cell connection patterns for connecting other ones of the plurality of input terminals to respective ones of a plurality of fixed potentials and
    the load-capacitor cell data allows assessing correspondence between load capacitances connected to a node and a plurality of load-capacitor cell connection patterns for connecting one or more of the plurality of input terminals to the node;
    selecting a second plurality of types of standard cells including the specified type standard cell from the first plurality of types of standard cells, using the CAD system; and
    placing a plurality of standard cells based on the layout data for each of the second plurality of types of standard cells and routing the placed standard cells with each other using the CAD system to design a semiconductor integrated circuit comprising a circuit block, the circuit block including at least one logic circuit having a signal route,
    wherein the placing and routing includes:
        when the standard cell library comprises the delay-adjusting cell data for the specified type standard cell:
            connecting a delay input terminal selected from a plurality of input terminals and an output terminal of a first standard cell, which is placed based on the layout data for the specified type standard cell, to a first node and a second node, respectively, on the signal route; and
            connecting other ones of the plurality of input terminals with a first connection pattern selected from the plurality of delay-adjusting cell connection patterns to respective ones of a plurality of fixed potentials; and
        when the standard cell library comprises the load-capacitor cell data for the specified type standard cell:
            connecting a plurality of input terminals of a first standard cell, which is placed based on the layout data for the specified type standard cell, to a first node on the signal route with a first connection pattern selected from i) the plurality of load-capacitor cell connection patterns and ii) a pattern in which none of the input terminals is connected; and
            the placing and routing includes connecting two or more input terminals and an output terminal of a second standard cell, which is placed based on the layout data for the specified type standard cell, to respective nodes on the signal route such that a result of logical operation between variables input to the two or more input terminals is output from the output terminal.

2. The method of claim 1, further comprising:
    after the placing and routing, performing a timing evaluation of the logic circuit; and
    correcting the first connection pattern depending on a result of the evaluation.

3. The method of claim 1, wherein the standard cell library comprises the delay-adjustment cell data for the specified type standard cell.

4. The method of claim 3, wherein:
    the standard cell library further comprises load-capacitor cell data for a second specified type standard cell among the plurality of types of standard cells,
    the second specified type standard cell has a second plurality of input terminals and an output terminal, and the load-capacitor cell data allows assessing correspondence between load capacitances connected to a node and a plurality of load-capacitor cell connection patterns for connecting one or more of the second plurality of input terminals to the node;
    the selecting is performed such that the second plurality of types of standard cells includes the second specified type standard cell; and
    the placing and routing includes connecting a second plurality of input terminals of a third standard cell, which is placed based on the layout data for the second specified type standard cell, to a third node on the signal route with a second connection pattern selected from i) the plurality of load-capacitor cell connection patterns and ii) a pattern in which none of the second plurality of input terminals is connected.

5. The method of claim 4, wherein:
    the delay-adjusting cell data allows assessing the correspondence between the delay times and the delay-adjusting cell connection patterns for different load capacitances connected to the output terminal; and
    the placing and routing is performed such that the second node and the third node are the same.

6. The method of claim 1, wherein the standard cell library comprises the load-capacitor cell data for the specified type standard cell.

7. A method of designing semiconductor integrated circuit, comprising:
    selecting, from a standard cell library prepared in a CAD system comprising standard cell data including logical function data and layout data for each of a first plurality of types of standard cells, a second plurality of types of standard cells including a specified type standard cell using the CAD system; and
    placing a plurality of standard cells based on the layout data for each of the second plurality of types of standard cells and routing the placed standard cells with each other using the CAD system to design a semiconductor integrated circuit comprising a circuit block, the circuit block including at least one logic circuit having a signal route,
    wherein the placing and routing includes:
        one of (1) connecting a delay input terminal selected from a plurality of input terminals and an output terminal of a first standard cell, which is placed based on the layout data for the specified type standard cell, to a first and a second node, respectively, on the signal route and other ones of the plurality of input terminals of the first standard cell with a first connection pattern selected from a plurality of delay-adjusting cell connection patterns for connecting other ones of the plurality of input terminals to respective ones of a plurality of fixed potentials, and (2) connecting a plurality of input terminals of a first standard cell, which is placed based on the layout data for the specified type standard cell, to a first node on the signal route with a first connection pattern selected from i) the plurality of load-capacitor cell connection patterns for connecting one or more of the plurality of input terminals and ii) a pattern in which none of the input terminals is connected; and connecting two or more input terminals and an output terminal of a second standard cell, which is placed based on the layout data for the specified type standard cell, to respective nodes on the signal route such that a result of logical operation between variables input to the two or more input terminals is output from the output terminal.

8. The method of claim 7, further comprising:
after the placing and routing, conducting a timing evaluation of the logic circuit; and
correcting the first connection pattern depending on a result of the evaluation.

9. The method of claim 7, wherein the placing and routing includes connecting the delay input terminal and the output terminal of the first standard cell to the first and second nodes.

10. The method of claim 9, wherein:
the selecting is performed such that the second plurality of standard cells includes a second specified type standard cell; and
the placing and routing includes:
connecting a second plurality of input terminals of a third standard cell, which is placed based on the layout data for the second specified type standard cell, to a third node on the signal route with a second connecting pattern selected from i) a plurality of load-capacitor cell connection patterns for connecting one or more of the second plurality of input terminals to the third node and ii) a pattern in which none of the second plurality of input terminals is connected; and
connecting two or more input terminals and an output terminal of a fourth standard cell, which is placed based on the layout data for the second specified type standard cell, to respective nodes on the signal route such that a result of logical operation between variables input to the two or more input terminals is output from the output terminal.

11. The method of claim 10, wherein the placing and routing is performed such that the second node and the third node are the same.

12. The method of claim 7, wherein the placing and routing includes connecting the plurality of input terminals of the first standard cell to the first node.

13. A semiconductor integrated circuit, comprising:
a circuit block including at least one logic circuit, the logic circuit comprising a plurality of standard cells having respective layouts and logical functions placed and routed with each other to form a signal route, wherein:
the plurality of standard cells includes a first standard cell and a second standard cell both having a same specified layout;

one of (1) a delay input terminal selected from a plurality of input terminals and an output terminal of the first standard cell are connected to a first node and a second node, respectively, on the signal route and other ones of the plurality of input terminals of the first standard cell are connected with a first connection pattern selected from a plurality of delay-adjusting cell connection patterns for connecting other ones of the plurality of input terminals to respective ones of a plurality of fixed potentials; and (2) a plurality of input terminals of the first standard cell are connected to a first node on the signal route with a first connection pattern selected from i) a plurality of load-capacitor cell connection patterns for connecting one or more of the plurality of input terminals and ii) a pattern in which none of the plurality of input terminals is connected; and
two or more input terminals and an output terminal of the second standard cell are connected to respective nodes on the signal route such that a result of logical operation between variables input to the two or more input terminals is output from the output terminal.

14. The semiconductor integrated circuit of claim 13, wherein the first standard cell has delay times between the delay input terminal and the output terminal corresponding to the plurality of delay-adjusting cell connection patterns.

15. The semiconductor integrated circuit of claim 14, wherein:
the plurality of standard cells placed in the logic circuit further includes a third standard cell and a fourth standard cell both having a same second specified layout;
a plurality of input terminals of the third standard cell are connected to a third node on the signal route with a second connection pattern selected from i) a plurality of load-capacitor cell connection patterns for connecting one or more of the plurality of input terminals to the third node and ii) a pattern in which none of the plurality of input terminals is connected; and
two or more input terminals and an output terminal of the fourth standard cell are connected to respective nodes on the signal route such that a result of logical operation of variables input to the two or more input terminals is output from the output terminal.

16. The semiconductor integrated circuit of claim 15, wherein the second node and the third node are the same.

17. The semiconductor integrated circuit of claim 14, wherein the plurality of standard cells further include:
a fifth standard cell having the same specified layout, a delay input terminal selected from a plurality of input terminals and an output terminal of the fifth standard cell being connected to a fourth node and a fifth node, respectively, on the signal route and other ones of the input terminals of the fifth standard cell being connected with a third connection pattern selected from the plurality of delay-adjusting cell connection patterns, the third connection pattern being different from the first connection pattern.

18. The semiconductor integrated circuit of claim 13, further comprising a switch that selects the first connection pattern.

19. The semiconductor integrated circuit of claim 13, wherein the first standard cell has load capacitances connected to the first node corresponding to the plurality of load-capacitor cell connection patterns.

* * * * *